United States Patent
Hudman et al.

(10) Patent No.: US 6,977,594 B2
(45) Date of Patent: Dec. 20, 2005

(54) INDUCTIVE POSITION DETECTOR

(75) Inventors: Frederick Mark Hudman, Coalville (GB); Geoffrey Glasgow, Coalville (GB); Nigel Atherton, Loughborough (GB)

(73) Assignee: Newall Measurement Systems Limited, London (GB)

( * ) Notice: Subject to any disclaimer, the term of this patent is extended or adjusted under 35 U.S.C. 154(b) by 0 days.

(21) Appl. No.: 10/483,550

(22) PCT Filed: Jul. 3, 2002

(86) PCT No.: PCT/GB02/03102

§ 371 (c)(1),
(2), (4) Date: Jan. 8, 2004

(87) PCT Pub. No.: WO03/006927

PCT Pub. Date: Jan. 23, 2003

(65) Prior Publication Data

US 2004/0217885 A1   Nov. 4, 2004

(30) Foreign Application Priority Data

Jul. 11, 2001 (GB) .................................. 0116953

(51) Int. Cl.[7] .......................................... G08B 21/00
(52) U.S. Cl. ............... 340/686.1; 318/653; 324/207.15
(58) Field of Search .................. 340/448, 686.1, 340/686.2, 686.5; 318/652, 653; 324/207.15–207.2

(56) References Cited

U.S. PATENT DOCUMENTS

| | | | |
|---|---|---|---|
| 4,100,485 A | * 7/1978 | Rogers | 324/207.17 |
| 4,103,222 A | * 7/1978 | Phillips et al. | 324/207.17 |
| 4,581,525 A | 4/1986 | Horstmann | |
| 5,029,304 A | 7/1991 | Tolmie, Jr. | |
| 6,545,461 B1 | * 4/2003 | Miyata | 324/207.17 |
| 6,693,420 B1 | * 2/2004 | Gill | 324/207.16 |

FOREIGN PATENT DOCUMENTS

WO    WO 00 6972    2/2000

OTHER PUBLICATIONS

Copy of International Search Report for PCT/GB 02/03102 (2 pages).

* cited by examiner

*Primary Examiner*—Jeffery Hofsass
*Assistant Examiner*—George Bugg
(74) *Attorney, Agent, or Firm*—Luedeka, Neely & Graham, P.C.

(57)   ABSTRACT

Inductive position detector (10) is described which includes scale (20) having a longitudinal axis containing a train of magnetic balls (22), and a transducer (30) moveable relative to the scale (20). The transducer (30) includes means to induce a magnetic field in the scale (20). Magnetic markers (23) are provided at axially spaced locations along the scale (20). As the transducer (30) is moved along the scale (20), the pattern of magnetic markers (23) detected enables the position of the transducer to be determined.

18 Claims, 2 Drawing Sheets

0=No magnet
1=Magnet north pole
2=Magnet south pole

INDUCTIVE POSITION DETECTOR

The invention relates to inductive position detectors, particularly of the type described in GB1513567 and developments thereof. Such devices are typically attached to machine tools and can be used to determine the position of the machine tool head with respect to a workpiece.

Detectors of this type comprise an elongate magnetic element which has a periodically varying dimension in a direction perpendicular to the longitudinal axis of the element. The element is typically a train of steel balls arranged in a line in point contact. A transducer, which surrounds the magnetic element and travels along its length, is used to induce a magnetic field in the element. The periodic variations in the dimension of the element result in detectable periodic variations in the magnetic field, and as such, provide corresponding periodically varying signalling which can be used to determine the relative position of the element with respect to the transducer. In use, the element and the transducer are provided on the machine tool to measure, for example, the position of the tool head with respect to the workpiece.

Currently, actual position is determined with reference to a single datum, which is external to and separate from the position detector. The location of the datum is also manually programmed into the detector in the following manner. Prior to programming the datum, the machine tool user identifies a datum point, typically on the machine tool itself, and moves the detector to this datum point. At this point, the same signalling used to determine relative position between the element and the transducer is analysed and recorded. As the signalling varies periodically with position, the detector needs to record how many periods it has travelled through as well as where it is on a particular period.

The datum needs to be reset each time the position detector is switched off, for example, at the end of each working day. This can be awkward, lead to errors and be time consuming, particularly if the machine tool is part way through processing a workpiece.

Accordingly, the present invention provides an inductive position detector comprising a first member having a longitudinal axis and an element of magnetic material extending in the direction of the longitudinal axis and having a periodically varying dimension in a direction perpendicular to the longitudinal axis, and a second member moveable relatively to the first member along the longitudinal axis and comprising means to induce a magnetic field in the element, wherein a detectable reference marker is provided on the first member, distinct from the element.

As the datum position is fixed within the detector, a user no longer needs to select a particular datum and go through the manual procedure of programming the datum. Therefore, the possibility of human error in programming the datum is reduced. In addition, programming the datum can be an automated process, not requiring the intervention of the user. Therefore, the task can be completed more quickly.

Prior art devices rely on recording incremental changes in position to determine actual position with respect to the datum. Thus, if any reading is missed, this will lead to an error. When the transducer is moved a significant distance, these errors can add up and become significant.

In particular, when steel balls are used as the magnetic element, an overall position value is determined by counting the number of balls traversed from the datum point, referred to herein as pitch count, and also the position along each ball, referred to herein as bit count. The pitch count is therefore a relatively low precision measurement and the bit count is a high precision measurement. However, an error in pitch count may occur if the element is moved too quickly for a change to be registered by the detector and can lead to significant errors in the actual position measured.

Furthermore, the single reference datum is normally positioned at one end of the travel of the transducer along the element. Therefore, the transducer needs to be moved out of position and to the datum position, which can be several metres away, prior to the datum being set and the transducer being moved back into position. The further the transducer is moved, the greater the chance of the errors referred to above occurring.

Preferably, the position detector may be provided with plurality of axially spaced markers. This allows the position detector to determine its datum without the need to return to a single unique position to reset the datum.

In order to be able to do this, the detector requires some additional information to enable it to determine which marker it is detecting.

One way to do this is to position the markers at different angular positions around the circumference of the magnetic element, thereby giving different characteristic signals.

In another example, the markers may be positioned with a non-uniform spacing between adjacent markers. With knowledge of the axial position of each non-uniform marker spacing along the length of the first member, the detector is able to recognise a particular spacing or combination of spacings of adjacent members as characteristic of a particular position along the element. Therefore, position can be determined without the need to travel a long distance to find the datum.

The non-uniform spacing could be a random or irregular one, provided that it is known by the detector. However, preferably each interval between adjacent markers is a multiple of a fixed value. Thus, at each interval equal to the fixed value, the detector will either detect the presence of a marker, or will note the absence of a marker. This essentially produces a binary code. By suitably arranging the markers, a segment of binary code for each section of the element can be made unique. The number of digits required to make each binary code segment unique will depend on the length of the element and the spacing of the markers. However, the detector will always need to detect only relatively few markers to determine this unique code. The technique also produces signalling which is particularly suitable to digital circuitry.

If the fixed value is equal to the period of the periodically varying dimension of the element, the signal processing to determine the position of the detector is made simpler.

The length of each marker is preferably less than the varying element period dimension. Thus, when a marker is detected, this need not give precise information about the position of the marker. Instead, it may provide a 'window' in which the minimum dimension occurs. The precise position can then be determined from the signal provided by the inductive element.

When using a plurality of markers, the markers may produce different characteristic signals from one another. Rather than being limited to having to detect the spacings between markers, the ability to distinguish between markers makes it is possible for a single marker to provide more positional information and thus increases the flexibility of the detector. More positional information can therefore be provided in a given length along the element.

A particularly convenient way of providing different characteristic signals is for the markers to be magnetic and to be positioned such that for some markers the north pole is detectable, while for others the south pole is detectable. When the markers are spaced at multiples of a fixed value, such magnetic markers can be conveniently used to provide a base three signal, hence reducing the number of markers required to provide a unique signal.

One way in which the markers can be detected is to pass them under a single detector. Provided that the rate of relative movement or distance travelled between the first and second members is known, the position of each marker can then be determined. However, preferably, a number of axially spaced marker detectors are provided. This allows the presence of a number of markers to be detected simultaneously with only a short relative movement between the first and second members.

In the situation where the markers are spaced at a multiple of a fixed value equal to the period of the periodically varied dimension of the element, it is advantageous to space the detectors evenly at an interval equal to the period of the periodically varying dimension. With such an arrangement, a maximum relative movement of one period will ensure that each marker is detected by a marker detector.

In a development of such an arrangement, it would be preferable for each marker to produce a signal which is detectable by a marker detector when the marker is axially offset from the marker detector. Thus, it would be possible to determine whether a marker is between two detectors without any relative movement between the markers and detectors. This provides a true absolute position detection in as much as, when the detector is switched on, it can immediately determine its absolute position without relative movement between the members. The detection of the markers by the marker detectors enables the detector to set its absolute pitch count, while the inductive signal produced by the element allows it to determine the bit count within the pitch. Thus the detector can set a precision absolute datum.

In a preferred embodiment, the markers are positioned in a sequence comprising a series of segments of predetermined length, in each of which segments the arrangement of markers is unique. In this way, as soon as the arrangement of markers in one segment has been detected, a unique signal indicating the position is available.

It is preferable if the number of detectors provided is sufficient to detect the arrangement of markers in any one segment without relative movement between the detectors and the markers. This ensures absolute position detection in that the detectors can detect a unique position signal even when stationary. In order to achieve this, the number of detectors provided is conveniently greater than the maximum number of markers in a segment. In this way, there is always a detector sufficiently close to each marker in the segment in order to ensure that a strong signal can be detected.

Preferably, the position detector also includes means to determine which of the plurality of detectors is positioned closest to the markers in a segment so that only those best placed to read the strongest signals are employed to generate a position. One such embodiment uses a classification of the bit count, derived from the inductive element, to select an optimum subset of detectors from the plurality of detectors.

The element of magnetic material may comprise a train of substantially identical spherical balls disposed side by side in point contact and constrained against relative movement to one another. In such an arrangement, each marker may be conveniently located in a ring nested between adjacent balls.

Preferred embodiments of the invention will now be described with reference to the accompanying drawings in which.

Figure 2:
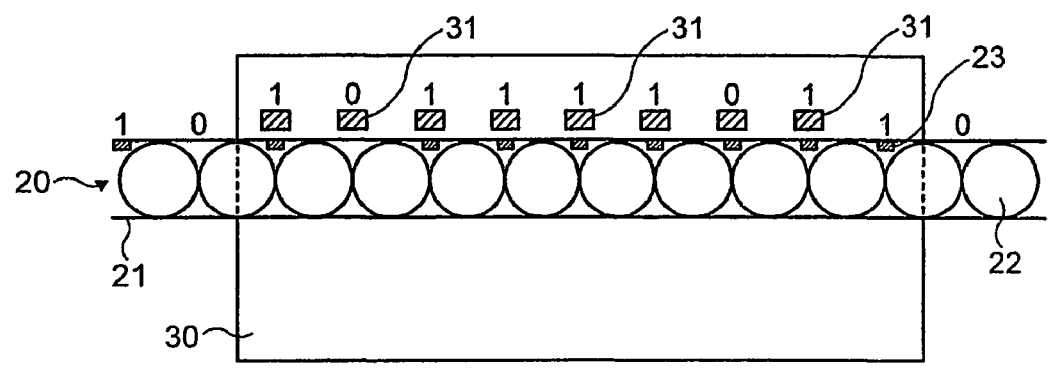
FIG. 2 illustrates a position detector according to another embodiment the present invention having a number of markers and a number of marker detectors.
Figure 3:
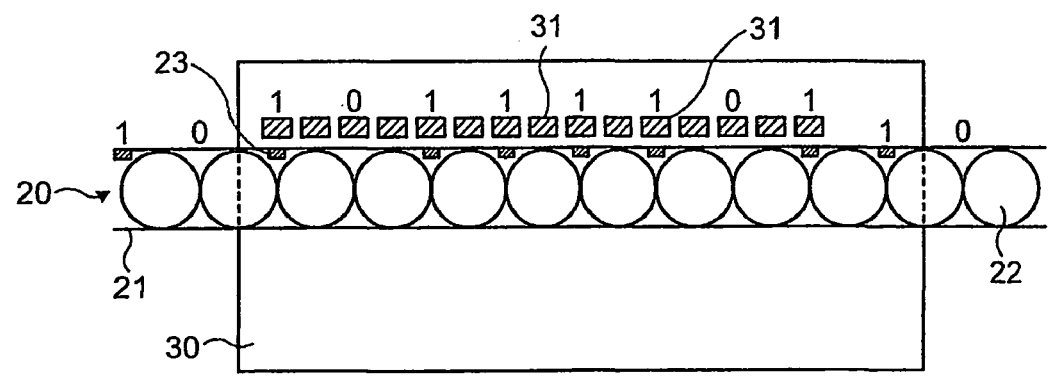
Figure 4:
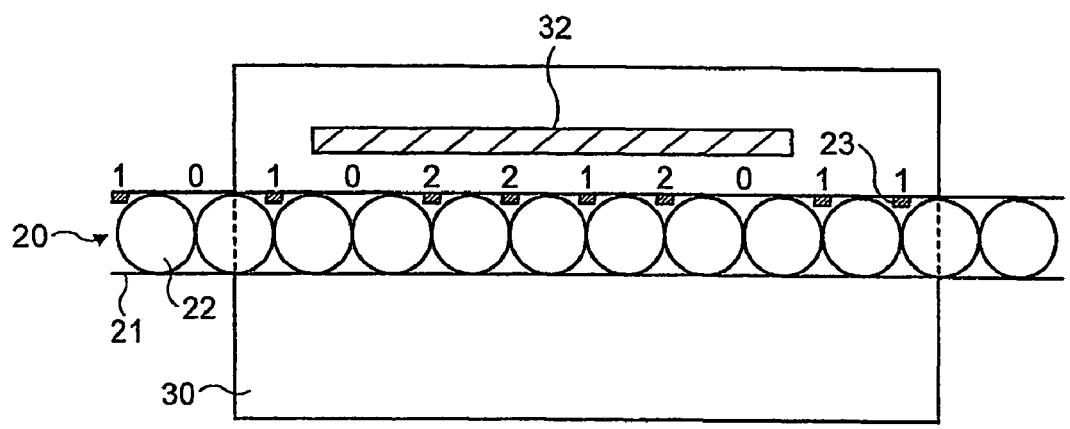
Figure 5:
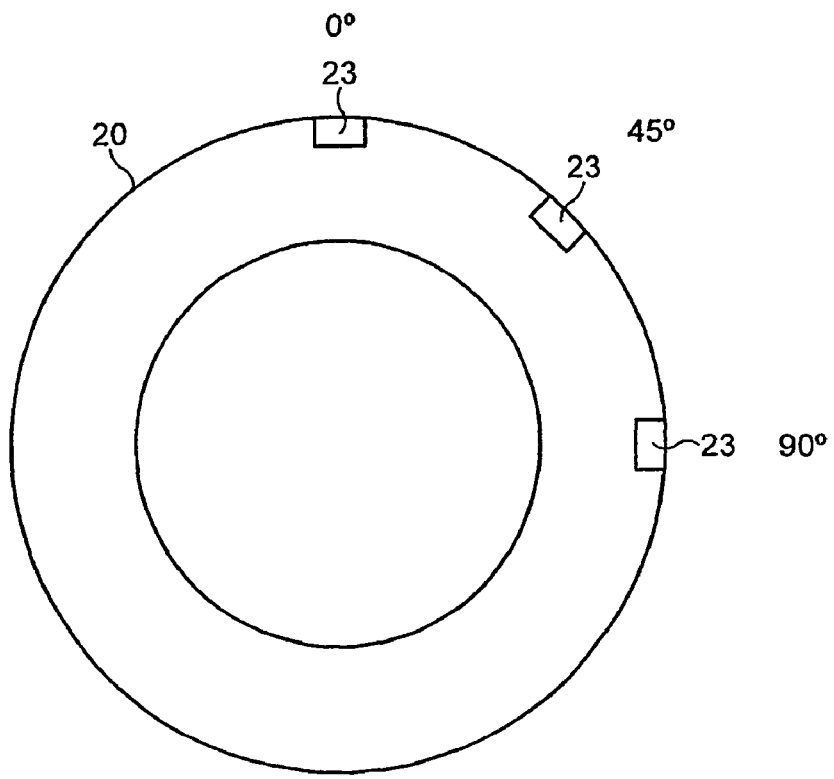

FIG. 3 illustrates a position detector according to a third embodiment, which is similar to FIG. 2 but with an alternative configuration of marker detectors; and FIG. 4 illustrates a position detector according to a fourth embodiment, with an array of detectors, and markers capable of giving different signals from one another; and FIG. 5 is a cross sectional view of the scale for a position detector according to a fifth embodiment of the invention.

Figure 1:
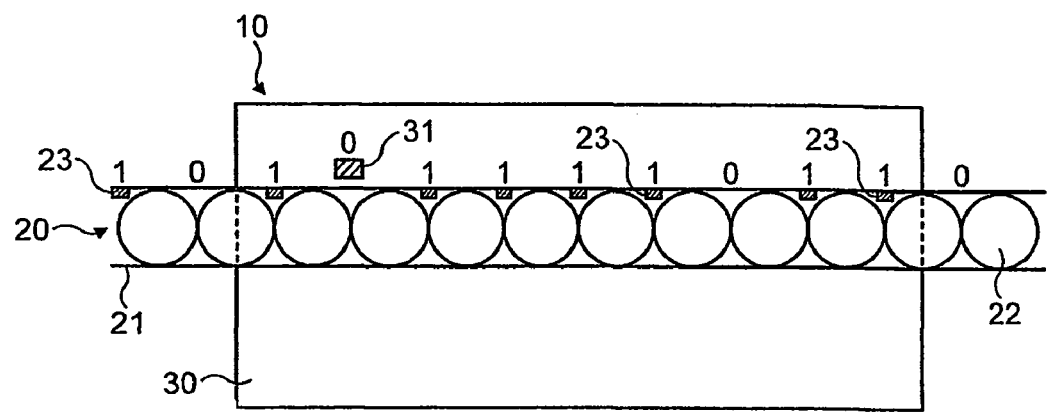
FIG. 1 illustrates a position detector according to one embodiment the present invention having a number of markers and a single marker detector.

The position detector 10 as shown in FIG. 1 comprises a scale 20 which extends longitudinally, and a transducer 30. The transducer 30 encircles the scale 20 and is moveable along the length of the scale 20.

The scale 20 comprises a tube 21 of non-magnetic material which houses a train of magnetic balls 22 in point contact and constrained to prevent relative ball movement. The transducer 30 comprises transmission coils (not shown) and pick-up coils (not shown). The transmission coils are used to induce a magnetic field along the line of point contact of the balls 22 and the pick-up coils are arranged to detect variations in the magnetic field as the balls 22 move relative to the pick-up coils. Detector circuitry (not shown) is used to analyse the signalling to give positional information. Such devices are well known in the art and one such device has been described in GB1513567. In particular, an overall position value is determined by counting the number of balls 22 traversed from a datum point, known as pitch count, combined with the position along each ball 22, known as bit count. The pitch count is a relatively low precision measurement and the bit count is a high precision measurement which is absolute within the pitch.

As shown in FIG. 1, a single marker detector 31, such as a Hall effect sensor, is provided in the transducer 30. A plurality of magnetic markers 23 are provided at axially spaced locations along the scale 20. Each marker 23 is positioned at an axial location level with a point of contact between two adjacent balls 22. It will be appreciated from FIG. 1 that there is sufficient space for the markers 23 to be positioned here, typically held in a plastic ring (not shown) which nests between but does not interfere with the magnetic balls 22.

The markers 23 are provided between some of the balls 22 but are not provided between every ball 22. Therefore, the markers 23 are positioned at intervals equal to multiples of the pitch of the scale 20, the pitch being the diameter of the balls 22.

The absence of a marker 23 provides no signal (0) to the marker detector 31 whereas the presence of a marker 23 provides a signal (1). Thus, as the transducer 30 is scanned past the scale 20, at each interval equal to one ball diameter (one pitch) the marker detector 31 detects either the presence or absence of a marker 23 to build up a unique binary signal which corresponds to a characteristic arrangement of markers 23.

The markers are arranged such that a binary sequence is provided which can be viewed as being made up of a series of overlapping segments, each having a given number of digits. A binary sequence can be generated in which no segment is repeated within a given possible maximum length. If a segment consists of 8 digits, a binary sequence of $2^8=256$ segments can be generated before repetition of a segment occurs.

By way of example, if the sequence starts with, say, 101100111010 . . . , the first 8 digit segment is 10110011. Moving along one pitch to the start the next segment, this second segment is 01100111. Moving along another pitch, the third segment is 11001110, and so on. Each of these segments is unique within the length of the scale 20.

Thus, with knowledge of what the binary sequence is along the scale 20, once the detector 31 has detected any 8 digit segment, it is able to identify its position relative to the scale 20 by identifying where in the known sequence that characteristic segment occurs.

A development of the invention is shown in FIG. 2. In this case, a number of marker detectors 31 are provided. Conveniently, the number of marker detectors 31 is equal to the number of digits in the binary code segment which is required to identify a particular characteristic arrangement. In this case, the binary code segment is 8 digits long and thus there are 8 marker detectors 31. Thus, it is only necessary to move the transducer 30 for a maximum distance of one pitch length (i.e. one ball diameter) in order to be able to read a whole segment and determine from that a position.

In the embodiment shown in FIG. 3, a plurality of analogue detectors 31 are provided. These are located at a spacing less than the pitch of the magnetic balls 22. The use of analogue detectors allows the presence of a marker 23 to be detected even when it is not directly aligned with a detector 31. Also, the strength of the signal detected by the detector 31 will vary in inverse proportion to its axial distance from the marker 23. Therefore, the detectors 31 are always able to determine the arrangement of markers 23 in the section of the scale 20 to which they are adjacent without requiring any relative movement between the transducer 30 and the scale 20. Thus, this arrangement offers true absolute position detection.

In a further embodiment illustrated in FIG. 4, markers 23 are used which can provide a characteristic signal differing from one another. In this example, magnetic markers 23 are used and are positioned as such that either the North pole or the South pole is detectable. Thus, the detectors 32 will detect either the absence of a marker (0), a North pole (1) or a South pole (2) even when the detectors are not directly aligned with the markers. This provides a base 3 code, rather than a binary code.

As mentioned above, a segment of code with a given number of digits must be chosen to represent a particular position. To provide absolute position detection the code segments along the whole length of the scale 20 must not repeat. This condition can be satisfied if a suitable mathematical algorithm is used to produce a pseudorandom sequence which in turn defines the marker positions. The advantage of a base 3 code rather than a binary code is that for a code segment of a given number of digits, a longer pseudorandom sequence can be generated before repetition of a particular segment occurs. Therefore, a longer scale 20 can be provided.

However, it is undesirable for the code segment to have too great a number of digits because as the number of digits increases a greater number of detectors 31 is required to read a segment without relative movement of the detectors 31 along the scale 20.

In a preferred embodiment, the chosen code segment is 6 digits in length. A base 3 sequence of $3^6=729$ unique code segments can therefore be generated.

In order to be able to detect a 6 digit code segment at any point, a plurality of detectors 31 closely packed in an array 32 is used which is sufficient to span more than six of the magnetic balls 22 in the scale 20. Furthermore, in order to most clearly detect a marker 23 (or the absence of a marker) even if a detector 31 is not located exactly aligned with a marker 23, it is preferable if the array 32 contains a number of detectors which is much greater than the number of digits in the code segment to be detected. Using the high precision bit count measurement which indicates the exact position over a ball 22, those detectors 31 in the array 32 which are best positioned to detect the strongest signals from the markers 23 in a particular segment can be chosen to provide the code segment, while the signals from the remaining detectors are filtered out. Typically, the bit count (i.e. the indication of position over a ball) is classified into a series of groups, and a particular subset of detectors 31 is associated with each group. Thus, if the bit count falls within a given group, the appropriate subset of detectors 31 is chosen to detect the signals from the markers 23.

In a preferred embodiment, the array 32 comprises 16 detectors 31 and is long enough to pick up the signals across 7 pitch-lengths. Therefore, two 6 digit code segments are detectable. Again, using the high precision bit count measurement to indicate the exact position over a ball 22 it can be determined which of the two consecutive 6 digit code segments the array 32 is closest to and so best placed to detect. The transition from one 6 digit code segment to the next is therefore as precise as the bit count measurement.

By ensuring that an entire code segment can be read by the array 32 at one time without the need to move the transducer 30, this embodiment provides absolute position detection, i.e. the device is capable of determining its exact position at all times, even if power is removed and restored with movement occurring during the absence of power.

FIG. 5 illustrates another embodiment of the invention in which, at a number of locations along the scale 20, one or more markers 23 are provided at differing angular positions around the circumference. In this example 3 markers 23 are shown at angles of 0°, 45° and 90°. However, fewer or more markers could be provided at other angular positions. According to the arrangement of markers 23 a different characteristic signal is provided. Thus, each characteristic signal provides a datum point on the scale 20.

Markers 23 may be arranged at relatively few axial locations along the scale 20 to provide a series of datums, so that a detector 31 need only be moved a relatively short distance to identify a datum. This does not provide absolute position detection but is a comparatively simple arrangement.

Alternatively, a greater number of markers 23 could be used at each of a greater number of locations so that characteristic signals sufficient to indicate position could be detected at any point. Such an arrangement would be more complex but could provide absolute position detection.

It should be noted that, in all of the above mentioned cases, the information provided by detecting the position of the detectors 31 provides a low precision detection but gives information about a unique position. Thus, by resolving the induced signal from the magnetic balls 22 and the unique signal produced by the markers 23, the position detector is able to determine its unique location with high precision.

What is claimed is:

1. An inductive position detector apparatus comprising:
a first member having a longitudinal axis and having an element of magnetic material extending in the direction of the longitudinal axis and having a periodically varying dimension in a direction perpendicular to the longitudinal axis;
a second member movable relatively to the first member along the longitudinal axis and having means to induce and detect a magnetic field in the element, the magnetic field having variations corresponding to the periodic variations in the dimensions of the element; and a detectable reference marker provided on the first member, distinct from the element.

2. The position detector as claimed in claim 1, comprising a plurality of markers.

3. The position detector as claimed in claim 2, wherein the markers are positioned with a non-uniform spacing between adjacent markers.

4. The position detector as claimed in claim 3, wherein each interval between adjacent markers is a multiple of a fixed value.

5. The position detector of claim 4, wherein the fixed value is equal to the period of the periodically varying dimension of the element.

6. The position detector as claimed in claim 2, wherein the markers produce different characteristic signals from one another.

7. The position detector as claimed in claim 6, wherein the markers are magnetic and are positioned such that, for some markers the north pole is detectable, while for others the south pole is detectable.

8. The position detector as claimed in claim 1, wherein the position of the marker coincides with a minimum dimension of the varying element dimension.

9. The position detector as claimed in claim 2, wherein the position of each marker coincides with a minimum dimension of the varying element dimension.

10. The position detector as claimed in claim 1 comprising a number of axially spaced marker detectors.

11. The position detector as claimed in claim 10, wherein the marker detectors are evenly spaced at an interval equal to the period of the periodically varying dimension of the element.

12. The position detector as claimed in claim 10, wherein each marker produces a signal which is detectable by a marker detector when the marker is axially offset from the marker detector.

13. The position detector as claimed in claim 2, wherein the markers are positioned in a sequence comprising a series of segments of predetermined length, wherein for each segment the arrangement of markers is unique.

14. The position detector as claimed in claim 13, wherein the number of detectors provided is sufficient to detect the arrangement of markers in any one segment without relative movement between the detectors and the markers.

15. The position detector as claimed in claim 14, wherein the number of detectors is greater than the maximum number of markers in a segment.

16. The position detector as claimed in claim 15, further comprising means to determine which of the plurality of detectors is positioned closest to the markers in a segment.

17. The position detector as claimed in claim 1, wherein the element of magnetic material comprises a train of substantially identical spherical balls disposed side by side in a line in point contact and constrained against relative movement to one another.

18. The position detector as claimed in claim 17, wherein the marker is located in a ring nested between adjacent balls.

* * * * *